(12) United States Patent
Okuno

(10) Patent No.: US 11,507,357 B2
(45) Date of Patent: Nov. 22, 2022

(54) INFORMATION PROCESSING DEVICE, METHOD OF INSTALLING SOFTWARE, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 27 days.

(21) Appl. No.: 17/030,986

(22) Filed: Sep. 24, 2020

(65) Prior Publication Data
US 2021/0096835 A1    Apr. 1, 2021

(30) Foreign Application Priority Data

Sep. 27, 2019    (JP) .............................. JP2019-177274

(51) Int. Cl.
*G06F 8/61* (2018.01)
*G06F 8/65* (2018.01)
*H04L 9/40* (2022.01)

(52) U.S. Cl.
CPC .................. *G06F 8/61* (2013.01); *G06F 8/65* (2013.01); *H04L 63/101* (2013.01)

(58) Field of Classification Search
CPC ...... G06F 8/61; G06F 8/65; G06F 2221/2141; H04L 63/101
See application file for complete search history.

(56) References Cited

U.S. PATENT DOCUMENTS

2003/0101264 A1* 5/2003 Yamada .............. G06F 21/6218
709/225
2007/0156693 A1* 7/2007 Soin .................... G06F 21/6218
(Continued)

FOREIGN PATENT DOCUMENTS

JP    2004-126863 A    4/2004

OTHER PUBLICATIONS

Smetters, Diana K., et al. "Instant matchmaking: Simple and secure integrated ubiquitous computing environments." International Conference on Ubiquitous Computing. Springer, Berlin, Heidelberg, 2006. (Year: 2006).*

(Continued)

*Primary Examiner* — S. Sough
*Assistant Examiner* — Joanne G Macasiano
(74) *Attorney, Agent, or Firm* — Scully Scott Murphy and Presser

(57) ABSTRACT

An information processing device is provided with a display, a communication interface, and a controller. The controller is configured to perform obtaining an access destination information from a storage, wherein one or more access destinations is to be included in the access destination information. When the controller receives, through the communication interface, an installation request to request to install software, the controller is configured to determine whether a new access destination is included in the software based on the obtained access destination information. Further, when it is determined that the new access destination is included in the software, the controller is configured to display an approval screen used to approve installation of the software. When it is determined that the new access destination is not included in the software, the controller is configured to omit the displaying of the approval screen.

22 Claims, 10 Drawing Sheets

(56) References Cited

U.S. PATENT DOCUMENTS

2015/0020214 A1* 1/2015 Copsey .............. H04L 63/0876
   726/27
2016/0234249 A1* 8/2016 Wong .................. H04L 61/1511
2017/0286707 A1* 10/2017 Eda ..................... G06F 16/1827

OTHER PUBLICATIONS

Prabhakara, Deepak. Web Applications Security: A security model for client-side web applications. MS thesis. Institutt for telematikk, 2009. (Year: 2009).*

* cited by examiner

REGISTRATION LIST

| ACCESS ID | ACCESS DESTINATION | ACCESS TYPE |
|---|---|---|
| 1 | http://abc/1.pdf | RECEPTION |
| 2 | http://abc/list | TRANSMISSION |
| 3 | http://xxx1/list | RECEPTION |
| 4 | http://xxx2/list | RECEPTION |
| ⋮ | ⋮ | ⋮ |

FIG. 2

WHITELIST

| DOMAIN ID | ACCESS DESTINATION |
|---|---|
| 1 | http://ccct |
| 2 | http://bbb |
| 3 | http://fff.com |
| 4 | http://ggg.org |
| ⋮ | ⋮ |

FIG. 3

ACCESS TYPE JUDGEMENT TABLE

| PARTICULAR ITEM | ACCESS TYPE | ACCESS DESTINATION |
|---|---|---|
| Download/DataURL | RECEPTION | BETWEEN TAGS |
| http_get | TRANSMISSION | ARGUMENT |
| Upload/DataURL | RECEPTION | BETWEEN TAGS |
| http_post | TRANSMISSION | ARGUMENT |

FIG. 4

(1) NEWLY INSTALLED APP 33A: DOWNLOAD AND PRINT FILE

```
<Download>
   <DataURL>http://abc/1.pdf</DataURL>
   <SaveName>abc.pdf</SaveName>
   <NextURL>2.xml</NextURL>
</Download>
```
1.xml

```
<Print>
   <File>abc.pdf</File>
   <Color>Mono</Color>
   <NextURL></NextURL>
</Print>
```
2.xml

FIG. 8A (2) UPDATED APP 33B: FILE TO BE PRINTED IS SELECTABLE

```
<ListView id="file_name">
   %(
     json =
http_get("http://bbb/list");
     for item in pairs(json) do
       output += string.format(
         '<Item value="%s">%s</Item>',
         item, item
       )
     end
   )%
   <NextURL>2.xml</NextURL>
</ListView>
```

↓ 1.xml

```
<Download>
   <DataURL>http://bbb/1.pdf</DataURL>
   <SaveName>%(=
file_name)%</SaveName>
   <NextURL>3.xml</NextURL>
</Download>
```

↓ 2.xml

```
<Print>
   <File>abc.pdf</File>
   <Color>Mono</Color>
   <NextURL></NextURL>
</Print>
```

3.xml

FIG. 8B (3) UPDATED APP 33C: FILE TO BE PRINTED IS SELECTABLE BY
    TRANSMITTING LOG-IN USER's INFORATMION

```
<ListView id="file_name">
  %(
    username = get_loin_user();
    json =
http_get("http://bbb/list", username);
    for item in pairs(json) do
      output += string.format(
        '<Item value="%s">%s</Item>',
        item, item
      )
    end
  )%
  <NextURL>2.xml</NextURL>
</ListView>
```

1.xml

```
<Download>
  <DataURL>http://bbb/1.pdf</DataURL>
  <SaveName>%(=
file_name)%</SaveName>
  <NextURL>3.xml</NextURL>
</Download>
```

2.xml

```
<Print>
  <File>abc.pdf</File>
  <Color>Mono</Color>
  <NextURL></NextURL>
</Print>
```

3.xml

FIG. 8C

INFORMATION PROCESSING DEVICE, METHOD OF INSTALLING SOFTWARE, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2019-177274 filed on Sep. 27, 2019. The entire subject matter of the application is incorporated herein by reference.

BACKGROUND

Technical Field

The present invention relates to an information processing device, a method of installing software, and a non-transitory computer-readable recording medium therefor.

Related Art

Conventionally, there have been proposed a variety of information processing devices which are configured to confirm the user's approval of software to be installed. For example, there are conventionally known object management devices configured to manage additions of application programs and changes to application programs in operation. When a new program is downloaded, this object management device receives an indication from the maintainer that the new program may or may not replace a portion of the application program in operation. When the object management device receives an instruction from the maintainer to start the replacement, the object management device compares the current application program with the updated version of the application program. If there are any inconsistencies, such as structure, as a result of the comparison, the object management device will abort the installation and perform a rollback to return the application program to the original state.

SUMMARY

As mentioned above, when updating an already-installed application program or installing a new application program, it is necessary to confirm the user's approval for the installation or the updating from a security point of view. On the other hand, if the user's approval is checked every time when an application program is installed/updated, it will lead to a decrease in usability.

According to aspects of the present disclosures, there is provided an information processing device, having a display, a communication interface and a controller. The controller is configured to perform obtaining an access destination information from a storage, wherein one or more access destinations is to be included in the access destination information, Further, when the controller receives, through the communication interface, an installation request to request to install software, the controller is configured to determine whether a new access destination is included in the software based on the obtained access destination information. When it is determined that the new access destination is included in the software, the controller is configured to display an approval screen used to approve installation of the software, while when it is determined that the new access destination is not included in the software, the controller is configured to omit the displaying of the approval screen.

According to aspects of the present disclosures, there is provided a method of installing software in an information processing device having a display and a communication interface. The method includes obtaining an access destination information from a storage, wherein one or more access destination is to be included in the access destination information, and, when an installation request to request to install software is received through the communication interface, determining whether a new access destination is included in the software based on the obtained access destination information. The method further includes, when it is determined that the new access destination is included in the software, displaying an approval screen used to approve installation of the software, while when it is determined that the new access destination is not included in the software, omitting the displaying of the approval screen.

According to aspects of the present disclosures, there is provided a non-transitory computer-readable recording medium for an information processing device provided with a display, a communication interface and a controller, the recording medium storing instructions which cause, when executed by the controller, the information processing device to perform obtaining an access destination information from a storage, wherein one or more access destinations is to be included in the access destination information, when the controller receives, through the communication interface, an installation request to request to install software, determining whether a new access destination is included in the software based on the obtained access destination information, when it is determined that the new access destination is included in the software, displaying an approval screen used to approve installation of the software, and when it is determined that the new access destination is not included in the software, omitting the displaying of the approval screen.

BRIEF DESCRIPTION OF THE ACCOMPANYING DRAWINGS

FIG. 1 is a block diagram showing an electrical configuration of an MFP.

FIG. 2 schematically shows a content of a registration list.

FIG. 3 schematically shows a content of a whitelist.

FIG. 4 schematically shows a content of an access destination type determining table.

FIGS. 8A-8C show charts showing examples of files included in an APP.

BRIEF DESCRIPTION OF THE EMBODIMENTS

Hereinafter, an MFP 1 according to an embodiment of the present disclosures will be described, with reference to accompanying drawings.

1. Configuration of MFP

Figure 1:
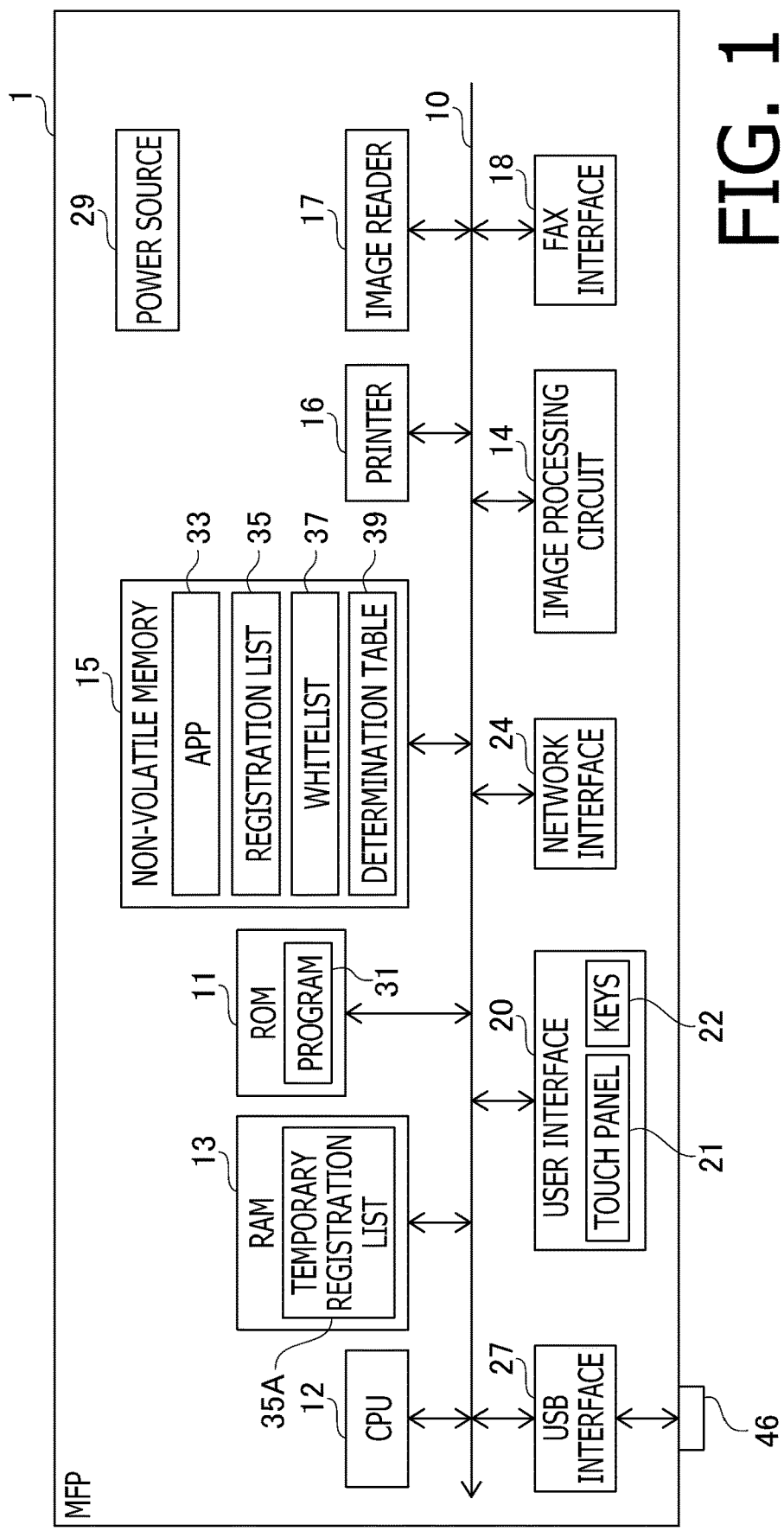

FIG. 1 is a block diagram showing an electrical configuration of the MFP 1. it is noted that the MFP 1 is an example of an information processing device. The MFP 1 is a multifunctional peripheral equipped with printing, copying, scanning, and fax functions. As shown in FIG. 1, the MFP 1 is equipped with a ROM 11, a CPU 12, a RAM 13, an image processing circuit 14, a non-volatile memory 15, a printer 16, an image reader 17, a facsimile interface 18, a user interface 20, a network interface 24, and a USB interface 27. These components (i.e., CPUs 12, etc.) are interconnected to each other by bus 10. In addition, the MFP 1 is equipped with a power source 29 that obtains power from a commercial power source and supplies the power to respective components. The power source 29 is equipped with a power supply cord and power supply circuits (e.g., bridge diode, smoothing circuit, etc.), generates a DC power from the commercial power supply, and supplies the DC power to each components of the MFP 1 through power supply lines.

The ROM 11 stores various programs 31. The programs 31 include, for example, a program that collectively controls respective components of the MFP 1. The CPU 12 executes the program 31 loaded from the ROM 11 to the RAM 13 and controls the components connected by the bus 10 while temporarily storing results of the processes in the RAM 13. The storage device to store the programs 31 is not limited to a ROM, but can be an HDD, an NVRAM, a flash memory, or a combination of the same.

The non-volatile memory 15 is configured to rewrites and retains data, and an EEPROM, an NVRAM, a flash memory, an HDD, etc. can be used as the non-volatile memory 15. The application program (hereinafter referred to as "APP") 33 is stored in the non-volatile memory 15. The APP 33, for example, realizes various services, by using the basic functions provided by the program 31. For example, the APP 33 performs display processing of the touch panel 21 based on the operation input through the touch panel 21 of the user interface 20.

In the following explanation, the MFP 1 that executes programs 31 and APP 33 in the CPU 12 may be described simply by the name of the device. For example, the description "the MFP 1 accepts operation input through the touch panel 21" may mean "the MFP 1 accepts operation input through the touch panel 21 by controlling the touch panel 21 by causing the CPU 12 to execute the programs 31 and/or the APP 33." In addition, the description "the MFP 1 accepts operation input through the touch panel 21" may mean "the MFP 1 accepts operation input through the touch panel 21 by causing the CPU 12 to execute the programs 31 and/or the APP 33 to control the touch panel 21.

As shown in FIG. 1, the non-volatile memory 15 of the present embodiment stores a registration list 35, a whitelist 37, and an access type determination table 39. The MFP1 according to the present embodiment is configured to install software such as the program 31 and the APP 33, etc., as will be described later. The MFP 1 analyzes the content of the software to be installed, and stores the access destination information included in the software installed in the past in the registration list 35.

FIG. 2 shows an example of the contents of a registration list 35 (an example of the access list of the present disclosures). As shown in FIG. 2, information on access ID, access destination, and access type are associated with each other and registered as one record in the registration list 35. The access ID is an identification number assigned to each record. The access destination is the information about the access destination that was included in the software.

It is noted that an example of the access destination in the present disclosures is a URL that indicates a location of a file or folder in a web server or file server on a network. The access destination according to the present disclosures is not limited to the URL. For example, the access destination may be a device name, a folder path, a file name, and the like that indicates the location of data in the device (USB memory, etc.) connected to the MFP 1. Further, the access destination is not limited to information for accessing data outside the MFP 1, but may be information (e.g., address values) for accessing a specific storage area in the MFP 1 (e.g., the ROM 11 or the non-volatile memory 15).

The whitelist 37 (an example of an access list of the present disclosures) is a list of access destinations to which access has been granted. FIG. 3 illustrates an example of the contents of the whitelist 37. As shown in FIG. 3, in the whitelist 37, for example, the domain ID and the information of the access destination are registered in relation to each other as one record. The administrator of the MFP 1 registers the URLs (domain names, etc.) to which access is granted in the whitelist 37. Although the method of registering the whitelist 37 is not particularly limited, it may be performed manually by the user by operating the user interface 20, a PC connected to the MFP1 or the like. Alternatively, the MFP 1 may access the manufacturer's server to obtain and update the whitelist 37.

As shown in FIG. 3, for example, a plurality of domain names are registered in the whitelist 37. As described later, the MFP 1 omits approval by the user when the access destination in the software is a domain name registered in the whitelist 37 as a result of analysis of the software to be installed. The information registered in the whitelist 37 is not limited to the domain name, but, for example, it may be information (e.g., an absolute path) indicating the location of a specific folder on the web server. Further, the MFP 1 may determine the access destination of the software by using a blacklist that registers access destinations to which access is not allowed. For example, the MFP 1 may omit approval by the user when the access destination in the software to be installed is a domain name that is not registered in the blacklist, and may execute approval when it is a registered domain name.

The access type determination table 39 is a table used for determining what kind of processing is to be executed when the software to be installed accesses the access destination. FIG. 4 shows an example of contents of the access type determination table 39. As shown in FIG. 4, in the access type determination table 39, for example, particular items, access types, and access destination information are registered in association with each other. The particular item is information for detecting a character string included in the software. The access type is the result of the determination when the associated character string of the particular item is detected, i.e., the type of processing to be performed. The access destination information is the information to detect the access destination by executing a process designated by the particular item. The details of an analysis method using the access type determination table 39 will be described later.

Returning to FIG. 1, the image processing circuit 14 is a circuit for processing and developing image data related to a print job, a scan job, and the like. The printer 16 has a print engine to form images according to image data on a sheet (e.g., paper, OHP, etc.). The print engine has, for example, an exposure device, a photoreceptor, a toner cartridge, etc., and executes printing in accordance with an electrophotographic imaging method. The print engine does not need to be limited to one configured to execute printing according to the electrophotographic printing system, but can also be configured to print, for example, by the inkjet system using an inkjet head.

The image reader 17 has a reading sensor for reading an image on an original document. For example, a CCD (Charge Coupled Devices), a CIS (Contact Image Sensor), etc. can be employed as the reading sensor. The image reader 17 moves the reading sensor relative to the original document placed on a document table to read the original document and generate image data representing the read image. The facsimile interface 18 is configured to transmit and receive facsimile data to and from another facsimile device via a telephone line.

The user interface 20 has a touch panel 21 and keys 22. For example, the touch panel 21 is equipped with a liquid crystal panel, a light source such as an LED that irradiates light from the back side of the liquid crystal panel, and a contact sensing film attached onto the surface of the liquid crystal panel. The keys 22 include a plurality of operating keys. The user interface 20 displays, for example, various setting screens and operating states of the device on the touch panel 21 under control of the CPU 12. Further, the user interface 20 transmits signals corresponding to the operation input to the touch panel 21 and the keys 22 to the CPU 12. Note that the MFP 1 of the present embodiment is equipped with the touch panel 21 that combines a display part and an operation part, but the configuration does not need to be limited to such a configuration, but a hardware keys may be provided as the operation part, for example, separately from the display part.

The network interface 24 is, for example, a LAN interface, and is configured such that a LAN cable is connectable to an external device (e.g., a router, a PC or the like). The MFP1 performs printing, scanning, fax transmission, etc., in accordance with the jobs (e.g., print jobs) received from external devices via the network interface 24. The method of connecting the MFP 1 to an external device does not need to be limited to the wired LAN, but, for example, a wireless LAN may be used.

A USB interface 27 is an interface for communication and power transfer conforming to the USB (Universal Serial Bus) standard. The USB standard does not need to be limited to a particular one, and can employ the USB 2.0 standard or the USB 3.0 standard. The USB interface 27 is connected to a USB port 46 attached to the MFP 1. The USB port 46 is a connector (i.e., a receptacle) that can be connected to USB devices. The USB interface 27 executes data input and output between the USB devices connected to the USB port 46 under control of the CPU 12.

2. Installation of Software

The MFP 1 according to the present embodiment receives an installation request to install software via the network interface 24 or the USB interface 27, and executes installation of the software. The software in the present invention is, for example, a program 31 (e.g., firmware) that provides basic functions of the MFP 1 and the APP 33 (e.g., an application program) that displays images on the touch panel 21. The software according to the present disclosures needs not be limited to the above-mentioned types, but may also be an add-on program that adds functions to various types of software, an operating system used to control a high-performance MFP 1, and the like. In the following description, a case of adopting APP 33 as the software according to the present disclosures will be described.

When the MFP 1 receives the installation request via, for example, the network interface 24, the MFP 1 downloads the APP 33 from the server and newly installs the APP 33. When the MFP 1 receives an update installation request via the network interface 24, the MFP 1 executes updating of the APP 33.

It is noted that a method of receiving the installation request and/or the APP 33 does not need to be limited to those using the network interface 24 or the USB interface 27. For example, the MFP 1 may be equipped with a communication interface according to other standards such as the IEEE 1394 standard, as a communication interface capable of receiving the installation request or the APP 33. The MFP 1 may also receive the installation requests and/or the APP 33 via a wireless communication interface such as the NFC (Near Field Communication) or Bluetooth (registered trademark). For example, the MFP 1 may receive the installation request from a mobile terminal via the Bluetooth (registered trademark) and may receive the APP 33 from a public server provided by the manufacturer via the network interface 24.

Further, the user may operate a terminal (e.g., a PC or a mobile terminal), in which a configuration tool provided by the manufacturer has been installed, transmit the installation request to the MFP 1, and install the APP 33 to the MFP 1. The users referred to here are, for example, workers of the dealer who sells the MFP 1 and/or end users (system administrators) who purchased the MFP 1. The worker typically operates the terminal to newly install or update the APP 33.

3. Installation Process

Next, the operation when the MFP 1 according to the present embodiment installs the APP 33 will be described with reference to FIGS. 5-7 and FIGS. 8A-8C. When the APP 33 is to be newly installed or updated, the MFP 1 according to the present embodiment analyzes the access destination of the APP 33, and determines whether to display an authentication screen according to the analyzation result. For example, when the MFP 1 receives the installation request of the APP 33 via the network interface 24, the MFP 1 downloads the APP 33 specified in the installation request from the manufacturer's server, executes the installation process shown in FIG. 5 for the downloaded APP 33 and determines the access destination. The MFP 1 executes the installation process by executing the program 31 by the CPU 12.

In the following description, a case of installing the APP 33 written in XML (Extensible Markup Language), as an example of the APP 33, will be described. It is noted that, as a computer language to describe the APP 33, various computer languages configured to describe commands to access files, etc. can be employed, besides markup languages such as XML. Example of such computer languages include data description languages such as JSON (JavaScript Object Notation), program languages such as JavaScript (registered trademark) and PHP, etc.

Further, the flowcharts in this specification basically show the processes of the CPU 12 in accordance with the instructions described in the program 31. That is, processes of "generating," "determining," "installing" and the like in the following description are processing performed by the CPU 12. It is noted that the processing by the CPU 12 includes a hardware control.

First, in step S11 of FIG. 5 (hereinafter simply referred to as "S"), the CPU 12 of the MFP 1 executes the registration list generating process for the APP 33 downloaded based on the installation request. FIG. 6 shows the contents of the registration list generating process. When the registration list generating process starts, the CPU 12 extracts a file to be analyzed from a target APP 33 to be installed (S21). FIGS.

8A-8C shows an example of files included in the APP 33. In the following description, for example, the APP 33 newly installed in the MFP 1 is assumed to be an APP 33A in FIG. 8A. In addition, the case where the APP 33A is subsequently updated to an APP 33B (FIG. 8B) or an APP 33C (FIG. 8C) is described.

Each of the APP 33A, 33B and 33C includes a plurality of files, each of which describes an operation based on the XML. The APP 33A includes two files (1.xml and 2.xml). The CPU 12 executes the 1.xml file of the APP 33A to access a URL (http://abc/1.pdf) between <DataURL> tags, and stores a downloaded pdf (Portable Document Format) format file (1.pdf) in the RAM 13 with the file name of abc.pdf. The CPU 12 then executes a file (2.xml) described between <NextURL> tags.

When the CPU 12 executes the 2.xml file, the abc.pdf stored in the RAM 13 is printed monochromatically. Since a next executable file is not specified in the <NextURL> tags, the CPU 12 terminates the process of executing the APP 33A. As described above, the APP 33A describes the processes of downloading and printing files separately for each file.

For the application 33A shown in FIG. 8A, the CPU 12 sequentially extracts the 1.xml file and the 2.xml file as files to be analyzed from the APP 33A (S21 of FIG. 6). That is, the CPU 12 extracts the 1.xml file at first execution of S21, and extracts the 2.xml file at second execution of S21. Note that the CPU 12 does not need to extract the analysis object in units of files. For example, the CPU 12 may extract programs written in the XML in particular line units (e.g., 10-line units) and process the extracted data as one analysis target.

After executing S21, the CPU 12 extracts a particular item registered in the access type determination table 39 (see FIG. 4) from the files to be analyzed extracted in S21 (S22). As shown in FIG. 4, a given item includes, for example, information on tags and scripts used to describe commands to access files, etc., in the XML. In other words, as shown with the underline in FIG. 8, a particular item includes the description contents of tags and scripts that serve as a marker for extraction when extracting a command to receive or transmit a file.

The CPU 12 extracts one portion corresponding to the particular item registered in the access type determination table 39 from among the files to be analyzed in S22. For example, the CPU 12 analyzes the contents described in order from the first line (the beginning of the file) of the file to be analyzed, and analyzes the contents until a particular item is detected. When detecting the particular items, the CPU 12 suspends the analysis of the files to be analyzed, and executes S23. In this case, the CPU 12 stores information on the number of interrupted lines and information indicating that a particular item has been detected in the RAM 13. The CPU 12 also executes S23 when the particular items are not detected and the file to be analyzed is analyzed up to the last line of the file. In this case, the CPU 12 stores the information indicating that the particular item could not be detected in the RAM 13.

In S23, the CPU 12 determines whether or not the particular items have been extracted based on the data stored in the RAM 13 in S22. For example, when the file to be analyzed is the 1.xml file of the application 33A of FIG. 8A, the CPU 12 detects, in S22, tags <Download>/<DataURL> registered in the access type determination table 39 on the first and second lines of the 1.xml file. Then, the CPU 12 makes an affirmative decision in S23 (S23: YES) and executes S25. On the other hand, if the particular item is not included in the 1.xml file, the CPU 12 makes a negative determination in S23 (S23: NO), and executes S33.

In S25, the CPU 12 determines the access type of the particular item (hereinafter, sometimes referred to as the item of interest) extracted in S22 based on the access type determination table 39. As shown in FIG. 4, the particular items and the access types are respectively associated with each other in the access type determination table 39. For example, when the extracted item is the <Download>/ <DataURL> tags, the CPU 12 determines that the access type is reception based on the access type determination table 39. After executing S25, the CPU 12 executes S27.

In S27, the CPU 12 extracts the access destination to be accessed based on the item of interest. As shown in FIGS. 8A-8C, the particular item for accessing data is associated with the access destination such as a URL. The access destination is described in a particular position defined in a computer language (in this case of the XML) that describes the APP 33A, such as between tags or the position of arguments. As shown in FIG. 4, the access destination information is stored in the access type determination table 39 as information for detecting the position where the access destination is described. The CPU 12 extracts the access destination based on the access destination information of the access type determination table 39. For example, in the case of the <DataURL> tags, the information between tags is stored in the access destination information, and the CPU 12 extracts the information (http://abc/1.pdf) sandwiched between the <DataURL> tags from the 1.xml file of the APP 33A, as access destination, based on the access destination information.

Although the above explanation uses the XML as an example of the computer language, the CPU 12 can extract information on the access destinations and the access types based on information such as tags, scripts, functions, and arguments defined in that computer language in the same way as it does for other computer languages. Accordingly, the MFP 1 may be provided with an access type determination table 39 for each type of computer language.

The method of extracting the access destination does not need to be limited to the method of analyzing the description of the computer language described above. For example, the CPU 12 may operate the file to be analyzed on a test basis using a driver that calls the file to be analyzed or a module such as a stub called from the file to be analyzed. The CPU 12 may extract the access destination from the data (arguments, etc.) transmitted to and received from the file to be analyzed. That is, the application 33A may be operated on a test basis to dynamically analyze the APP 33A, and when operated, the access destination may be extracted from information to be accessed.

After executing S27, the CPU 12 executes S29. In S29, the CPU 12 generates a registration list 35 in which the information of the access type determined in S25 is associated with the information of the access destination extracted in S27. Thus, the registration list 35 can be generated by extracting information on the access destination and the processing content (access type) after the access from the application 33A to be installed. For example, in S29, the CPU 12 temporarily stores the registration list 35 in which the access type is associated with the access destination in the RAM 13. As will be described later, when the APP 33A is installed, the CPU 12 updates the registration list 35 stored in the non-volatile memory 15 based on the information stored in the RAM 13, as shown in S20 of FIG. 5. When the APP 33A is not to be installed, the CPU 12 discards the registered list 35 stored in the RAM 13. In the following description, in order to distinguish the registration list 35 temporarily stored in the RAM 13 from the registration list 35 stored in the non-volatile memory 15, the registration list 35 temporarily stored in the RAM 13 will be referred to as a temporary registration list 35A (see FIG. 1).

In 29, the CPU 12 generates a temporary registration list 35A for each type of APP 33. For example, the CPU 12 generates a new temporary registration list 35A when the CPU 12 installs the APP 33A for the first time, and stores the temporary registration list 35A in the non-volatile memory 15 as the registration list 35 upon completion of the installation. The CPU 12 updates the registration list 35, which has been generated, when it updates the installed APP 33A to APP 33B or APP 33C. It is noted that, the CPU 12 may be configured to collectively manage the registration lists 35 as one list for multiple types of the APP 33. For example, the CPU 12 may be configured to manage access destinations and/or access types for the plurality of related apps 33 using one registration list 35.

After executing S29, the CPU 12 executes S31. In S31, the CPU 12 determines whether the files (1.xml) to be analyzed have been analyzed entirely. For the 1.xml file of the application 33A shown in FIG. 8A, the CPU 12 detects the <DataURL> tags (i.e., particular item) on the first and second lines (S22), interrupts the analysis and executes S23 onwards. After extracting the access type and the like, the CPU 12 makes a negative determination in S31 (S31: NO), and executes S22. The CPU 12 resumes parsing from the interrupted position (i.e., from line 3) in the 1.xml file (S22). If there is a particular item in the third line onwards, the CPU 12 makes an affirmative determination in S23 (S23: YES), and executes the process from S25 onwards, as in the case of the first detection.

The 1.xml file of the APP 33A does not include the particular items after the third line. Thus, the CPU 12 analyzes the 1.xml file to the end line, makes a negative determination (S23: NO), and executes S33. In S33, the CPU 12 determines whether or not the CPU 12 has analyzed all the files included in the APP 33A. As shown in FIG. 8, the APP 33A includes the 2.xml file in addition to the 1.xml file. Therefore, the CPU 12 makes a negative determination (S33: NO) and executes S21. In S21, the CPU 12 extracts the 2.xml file from the APP 33A as the next file to be analyzed, and the CPU 12 sets the 2.xml file as the file to be analyzed, and executes the process from S22. As a result, the CPU 12 can extract files one by one from the APP 33A of the installation object, analyze each file, and extract information on the access destination and access type. Then, the CPU 12 registers the extracted access destination, etc. in the temporary registration list 35A.

When the CPU 12 finishes the analysis of all the files included in the APP 33A, an affirmative determination is made in S33 (S33: YES), and the process shown in FIG. 6 is terminated. Returning to FIG. 5, the CPU 12 executes the registration list creation process in S11, and then executes S12. The CPU 12 determines whether or not the previously generated registration list 35 exists in the non-volatile memory 15 (S12). The CPU 12 of the present embodiment generates a registration list 35 for the APP 33A when the APP 33A is newly installed. When updating the APP 33A to the APP 33B or the APP 33C, the CPU 12 updates the registration list 35 that has already been generated. Therefore, when installing the APP 33A, that is, when newly installing the software, the registration list 35 has not been generated before. Accordingly, the CPU 12 makes a negative determination in S12 (S12: NO), and executes S17.

Figure 9:
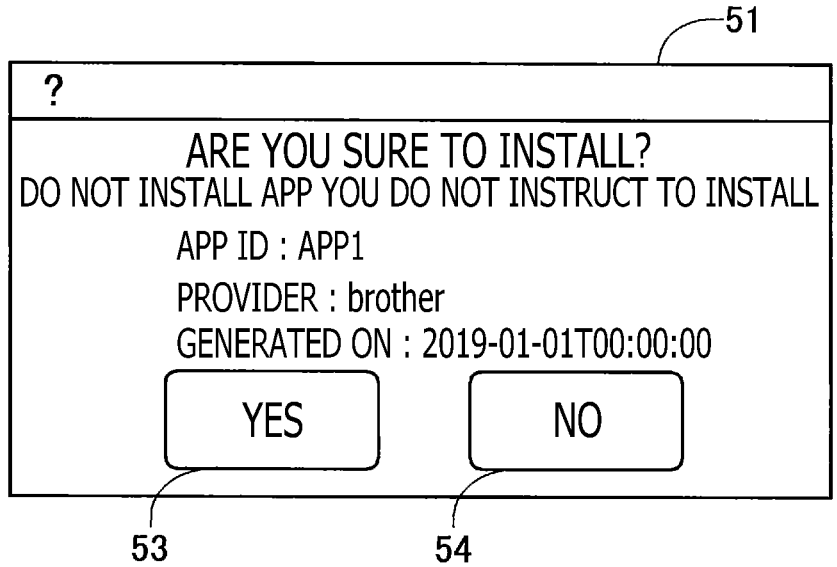
FIG. 9 shows an example of an approval screen.

In step S17, the CPU 12 displays the approval screen for installing the APP 33A. For example, the CPU 12 displays the approval screen 51 shown in FIG. 9 on the touch panel 21. As shown in FIG. 9, the CPU 12 displays a message to confirm whether the installation can be started or a warning message indicating "do not install APP you do not instruct to install" on the approval screen 51 and confirms the user's intention to the installation. Further, the CPU 12 displays the ID of the APP 33A, the information of the provider of the APP 33A, and the creation date and time of the APP 33A as reference information of the APP 33A. The CPU 12 also displays an OK button 53 for approval and a cancel button 54 for non-approval on the approval screen 51. By confirming the contents of the approval screen 51, the user can examine the security risk and the like of the APP 33A to be installed and determine the execution of the installation.

After executing S17, the CPU 12 determines whether or not the installation is approved by the user (S18). When the OK button 53 of the approval screen 51 is pressed, the CPU 12 makes an affirmative determination (S18: YES), and installs the APP 33A (S19). In S19, the CPU 12 executes, for example, a process of developing the data of the APP 33A into the non-volatile memory 15, a process of setting related registry values, and the like.

After the installation is completed, the CPU 12 stores the registration list 35 (S20), and the CPU 12 stores the information on the temporary registration list 35A stored in the RAM 13 in the non-volatile memory 15 as the registration list 35 in S29 of FIG. 6. As a result, the registration list 35 of the newly installed APP 33A is stored in the non-volatile memory 15. In the case of installing the APP 33B and the APP 33C, that is, in the case of updating, the CPU 12 updates the registration list 35 already stored in the non-volatile memory 15 with the information in the temporary registration list 35A in the RAM 13.

Figure 5:
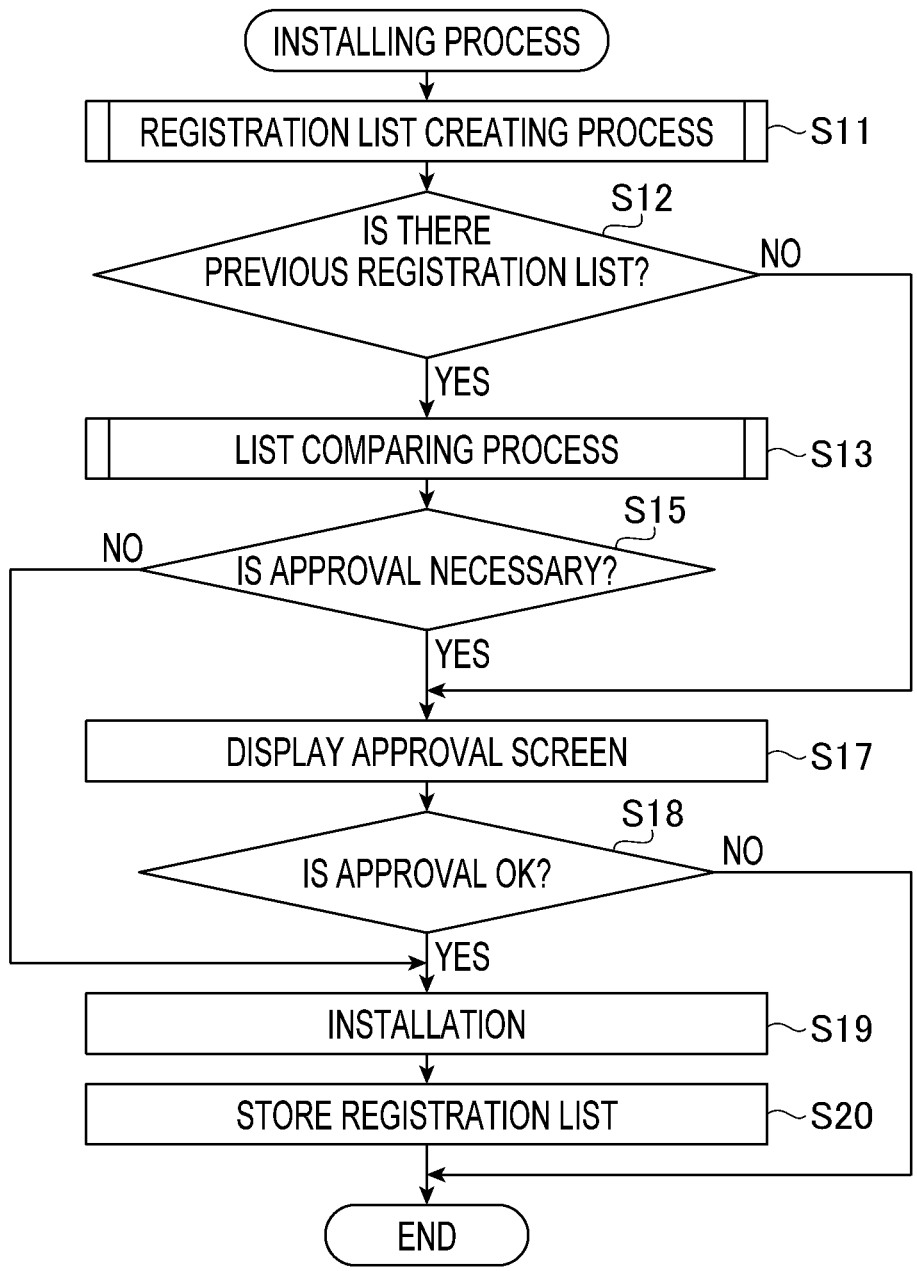
FIG. 5 is a flowchart illustrating an installing process.
Figure 6:
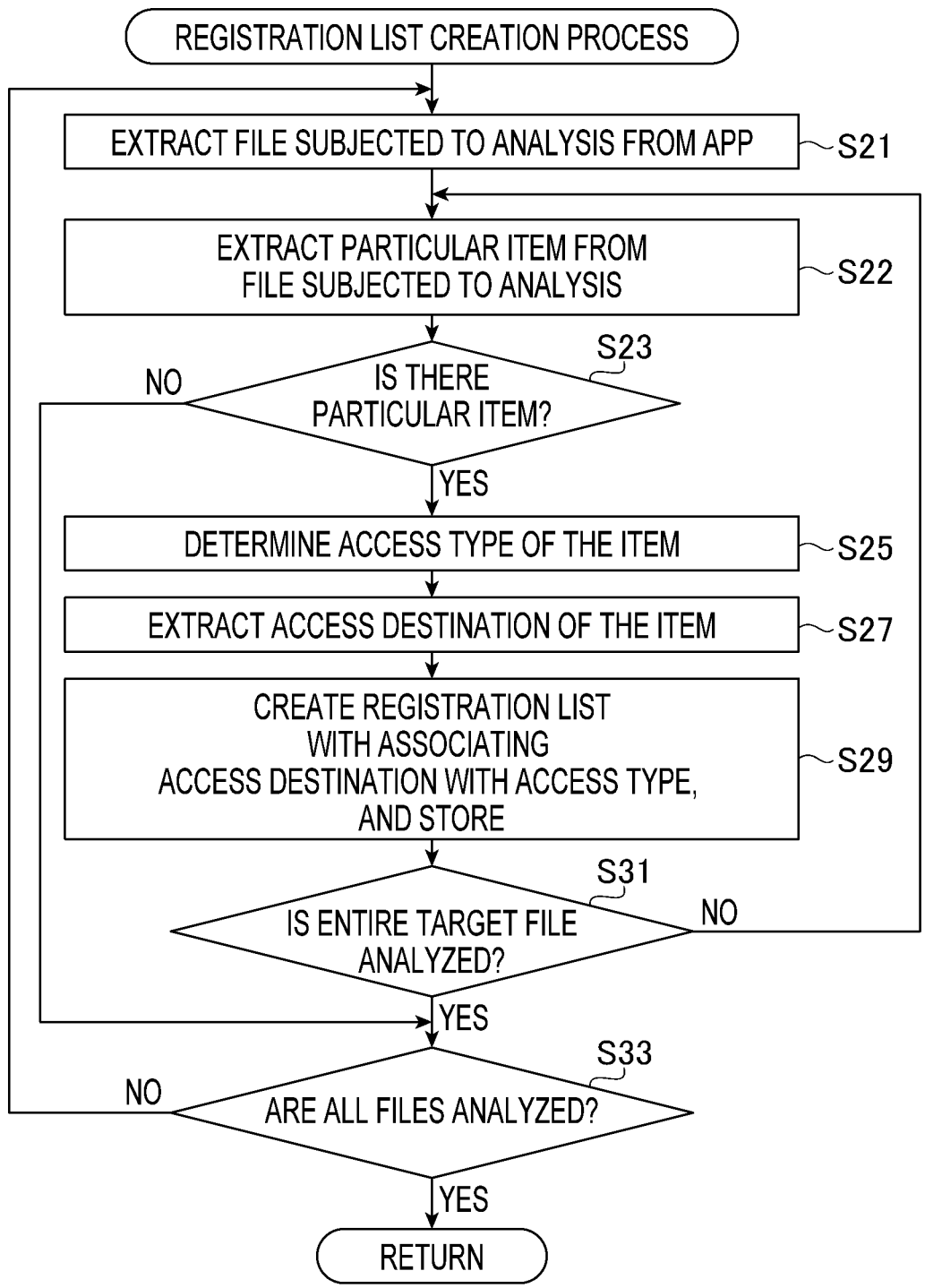
FIG. 6 is a flowchart illustrating a registration list generating process.

After executing S20, the CPU 12 terminates the process shown in FIG. 5. On the other hand, if the cancel button 54 is pressed on the approval screen 51 shown in FIG. 9, the CPU 12 makes a negative determination (S18: NO), and terminates the process shown in FIG. 5. In this case, the CPU 12 interrupts the installation because the installation was not approved, and the CPU 12 deletes the APP 33A from the RAM 13. It is noted that the CPU 12 also deletes the temporary registration list 35A which is temporarily stored in the RAM 13.

4. Update

Next, a case where the APP 33 is updated from the APP 33A to the APP 33B will be described. The CPU 12 determines the access destination of the APP 33B based on the registration list 35 or the whitelist 37 (see FIG. 3) generated when the APP 33A is installed, and determines whether to display the approval screen 51 based on the determination result. In the following description, descriptions similar to those in the above-described installation process of the APP 33A will be omitted as appropriate.

First, when the CPU 12 receives the installation request of the APP 33B through the network interface 24 and downloads the APP 33B, the CPU 12 executes the process of FIG. 5 on the data of the APP 33B. The CPU 12 executes the registration list creation process in S11, generates the temporary registration list 35A from the APP 33B, and temporarily stores the temporary registration list 35A in the RAM 13. The CPU 12 sequentially analyzes the files (1.xml-3.xml) of the APP 33B shown in FIG. 8B, and extracts information on the access destinations and access types.

Next, the CPU 12 executes S12. At the time when the APP 33A is updated to the APP 33B, the registration list 35 is already generated as the APP 33A is installed, and stored in the nonvolatile memory 15. Therefore, the CPU 12 makes a positive determination (S12: YES), and executes the list comparing process of S13.

Figure 7:
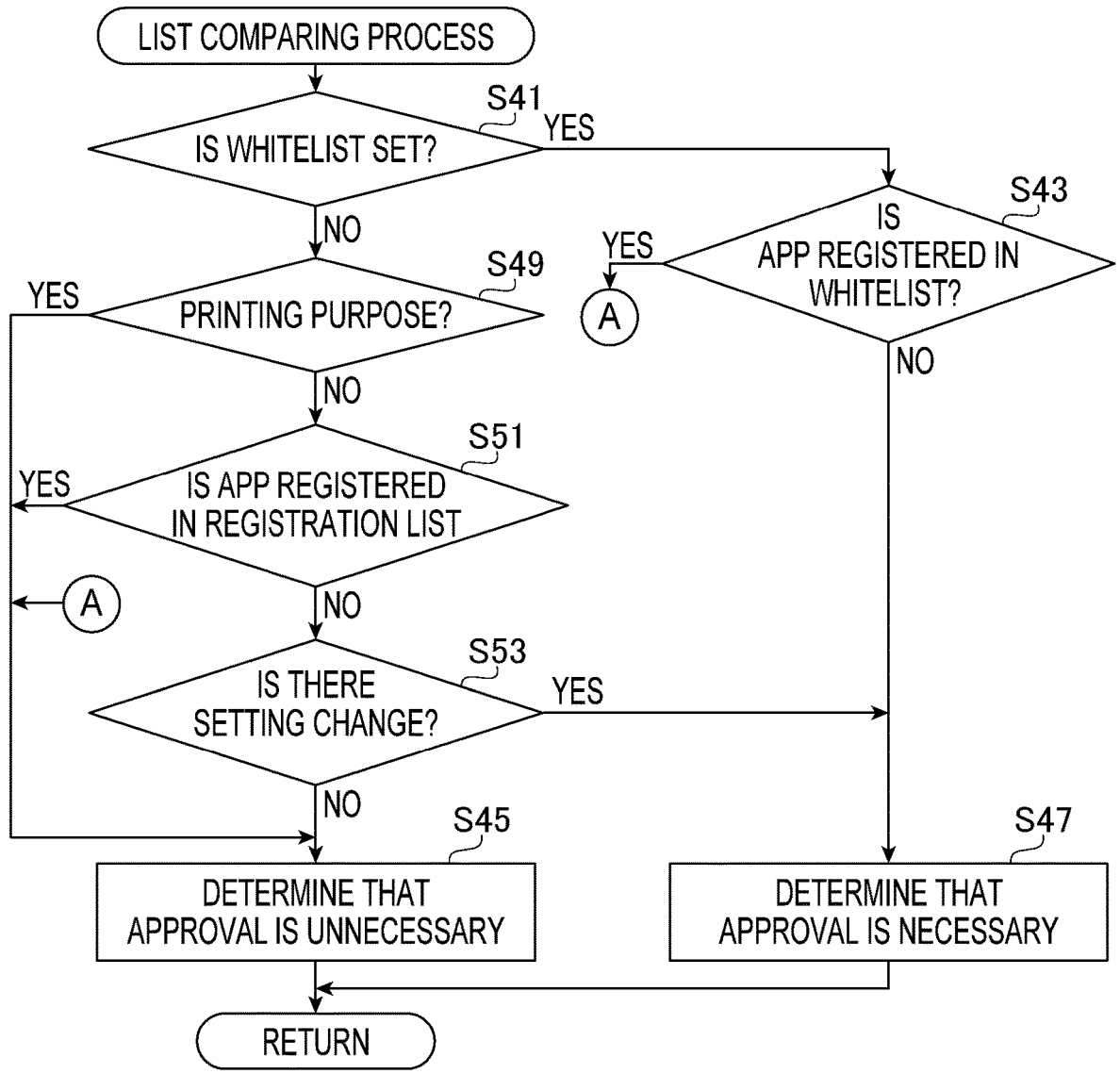
FIG. 7 is a flowchart illustrating a list comparing process.

FIG. 7 illustrates the list comparing process. First, the CPU 12 determines whether or not the whitelist 37 is set (S41). In the MFP 1 according to the present embodiment, the whitelist 37 is set (see FIG. 1 and FIG. 3). Therefore, the CPU 12 makes an affirmative determination (S41: YES), and executes S43. In S43, the CPU 12 obtains the whitelist 37 from the non-volatile memory 15, and determines whether or not the access destination extracted from the APP 33B to be installed is registered in the whitelist 37.

As shown in FIG. 8, the APP 33B executes a script in a LUA format by executing the 1.xml file, and displays a list of files in the URL (http://bbbb/list) assigned to the http_get function. When the APP 33B receives a user's selection from the listed files, the APP 33B executes the 2.xml file and downloads the selected file (1.pdf). Then, the APP 33B executes the 3.xml file to print the downloaded file.

As shown with the underline in FIG. 8, the APP 33B accesses the access destination (http://bbb/list) by executing the httpget function or the <DataURL> tags. This access destination (URL) is extracted in the registration list creation process of S11 in FIG. 5 and stored in the temporary registration list 35A in the RAM 13. Further, as shown in FIG. 3, multiple domain names are registered in the whitelist 37. The CPU 12 according to the present embodiment compares the domain name of the access destination included in the APP 33B to be installed with the domain name registered in the whitelist 37. As shown in FIG. 3, the domain name (http://bbb) of the APP 33B is registered in the whitelist 37 (see domain ID number 2). Therefore, the CPU 12 makes an affirmative determination (S43: YES), determines that approval is unnecessary (S45), and terminates the process shown in FIG. 7.

After executing S13 of FIG. 5, in S15, the CPU 12 makes determination based on the result of S13. Since it is determined that the approval is unnecessary in S13, the CPU 12 makes a negative determination (S15: NO), and executes S19. Thus, when the access destination (domain name) included in the APP 33B to be updated is registered in the whitelist 37, the display process of the approval screen 51 (S17) is omitted, and the installation of the APP 33B is started.

It is noted that, if the installation approval is confirmed each time the APP 33A is updated, usability will be degraded. On the other hand, the CPU 12 according to the present embodiment is configured such that, even if a new access destination for transmitting and receiving data is included in the update APP 33, if the access destination is registered in the whitelist 37, the approval is omitted. Therefore, the user can omit the approval for each update by registering the trusted access destinations in the whitelist 37 in advance.

The CPU 12 does not need to execute the determination based on the whitelist 37 by the domain name. For example, an absolute path may be registered in the whitelist 37, and the CPU 12 may be configured to make an affirmative determination in S43 when the absolute path of the access destination of the APP 33B matches the absolute path of the access destination registered in the whitelist 37.

When installation of the APP 33B is completed in S19, the CPU 12 updates the registration list 35 in the non-volatile memory 15 based on the temporary registration list 35A in the RAM 13, and registers the access destination of the APP 33B in the registration list 35 (S20). The CPU 12 registers, among the access destinations registered in the temporary registration list 35A (i.e., the access destinations included in the APP 33B), the access destinations that are not currently included in the registration list 35 in the registration list 35. Thus, the registration list 35 can be updated each time the APP 33A is updated.

On the other hand, if the access destination included in the APP 33B is not registered in the whitelist 37, that is, if a new access destination that is not registered in the whitelist 37 is included in the APP 33B, the CPU 12 makes a negative determination (S43: NO), and determines that approval is required (S47). For example, when a plurality of access destinations are included in the APP 33B, when all of the plurality of access destinations (domain names) have been registered in the whitelist 37, the CPU 12 makes an affirmative determination (S43:YES), while when at least one of the access destinations is not registered in the whitelist 37, the CPU 12 makes a negative determination (S43: NO). After executing S47, the CPU 12 makes an affirmative determination (S15: YES), and displays the approval screen 51 (S17). Thus, if the APP 33B includes access destinations that are not registered in the whitelist 37, it is possible to confirm the approval for the installation.

Figure 10:
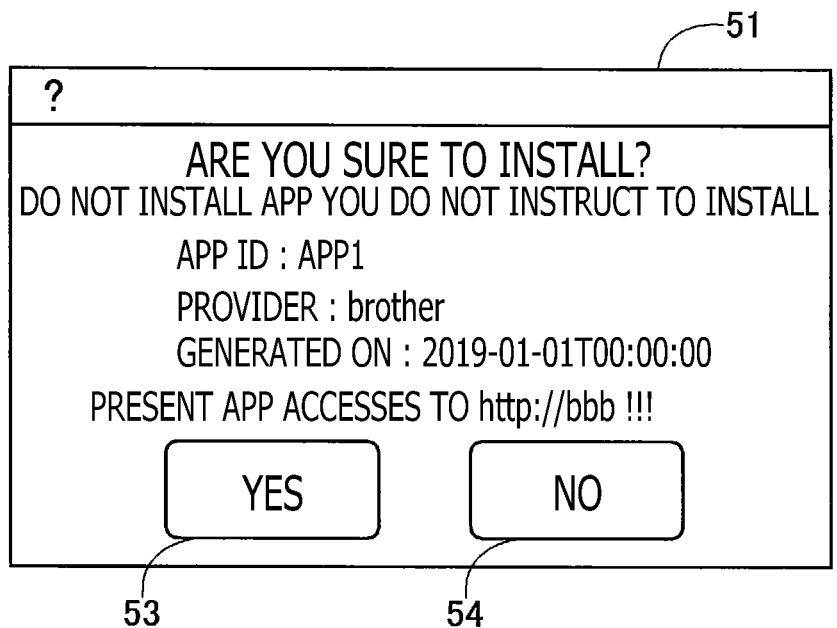
FIG. 10 shows another example of the approval screen.

The CPU 12 may be configured to display information related to the new access destination on the approval screen 51. For example, as illustrated in FIG. 10, the CPU 12 may display information (e.g., a URL) of a new access destination that is not registered in the whitelist 37 on the approval screen 51. Thus, by reviewing the display contents of the approval screen 51, the user can grasp what URL the new access destination not permitted in the whitelist 37 is, and can appropriately determine whether or not the installation is performed considering the security risk.

Next, a case where the whitelist 37 is not set will be described. When a negative determination is made in S41 (S41: NO), the CPU 12 executes S49. In S49, the CPU 12 determines whether or not the purpose of accessing the access destination included in the APP 33B is a printing purpose. As shown in FIG. 8, the APP 33B accesses a domain name (http://bbb/) different from the APP 33A, but after the access, the CPU 12 downloads the pdf file and executes printing. As described above, the APP 33B that is configured to receive and print the print data is unlikely to transmit the data externally, and it is considered that the security risk such as information leakage is low. Therefore, the CPU 12 omits the approval when the purpose of accessing is a printing purpose even when a new access destination that is not registered in the whitelist 37 is included in the APP 33B. When an affirmative determination is made (S49: YES), the CPU 12 determines that approval is unnecessary (S45). As a result, regarding the APP 33B of which purpose is printing, the approval can be omitted.

The method of determining whether the purpose of accessing the access destination of the APP 33B is the printing purpose or not is not particularly limited. For example, the CPU 12 may analyze the computer language in the APP 33B and determine whether or not the purpose for accessing the access destination is the printing purpose based on the function for executing printing or the processing content of the tag. Alternatively, the CPU 12 may execute the APP 33B on a test basis to verify and determine an operation such as whether to execute a print command to the printing unit 16.

Next, a case where the APP 33 is updated from the APP 33A to the APP 33C will be described. In the following description, the contents similar to those described in the above-described installation processing of the applications 33A and 33B are omitted as appropriate.

First, when the CPU 12 receives the installation request of the APP 33C, the CPU 12 executes the registration list generating process in S11 and generates the temporary registration list 35A from the APP 33C. The CPU 12 sequentially analyzes the files (1.xml-3.xml) shown in FIG. 8C, and registers information on the access destination and access type in the temporary registration list 35A. As shown in FIG. 8C, when the APP 33C executes the 1.xml file, the APP 33C receives the login name as the login user information from the user. The APP 33C assigns the accepted login name to username variable of the http_post function and sends the URL to (http://bbb/list) (see underlined portions in FIG. 8C). the CPU 12 prints the downloaded pdf file after transmitting the login name (2.xml, 3.xml).

If the whitelist 37 is not set to the MFP 1, the CPU 12 makes a negative determination in S41 (S41: NO), and executes S49. As described above, the APP 33C transmits the login name to the URL (http:/bbbb/list) by executing the 1.xml file before printing the pdf file, which is downloaded from the URL (http:/bbbb/list) by executing the 2.xml file or the 3.xml file. Therefore, the application 33C includes purposes other than printing as the purpose of accessing the URL (http:/bbbb/list). Therefore, in S49, the CPU 12 determines that the purpose of accessing the access destination included in APP 33C is not for printing (S49: NO), and executes S51.

In S51, the CPU 12 obtains the registration list 35 from the non-volatile memory 15 and determines whether or not a new access destination other than the access destinations registered in the registration list 35 is included in the APP 33C. As shown by underlining in FIG. 8, the access destination included in the APP 33C (http://bbb/list) is an access destination not included in the APP 33A. That is, a new access destination that is not registered in the registration list 35. When the APP 33C including such a new access destination is executed, there is a possibility that a security risk such as information leakage may occur by accessing a new access destination.

For example, as shown in FIG. 2, the CPU 12 updates the registration list 35 and registers information of a plurality of access destinations each time the APP 33 is updated. In S51, the CPU 12 compares the domain name (http://bbb) of the access destination included in the APP 33C with the domain name of the access destination registered in the registration list 35. That is, the CPU 12 determines whether or not a new access destination that is not included in the registration list 35 is included in the APP 33C based on the domain name. When at least one of the domain names included in the APP 33C is not registered in the registration list 35 (S51: NO), the CPU 12 executes S53. For example, the CPU 12 searches the registered list 35 for each domain name included in the APP 33C, and when at least one domain name cannot be found in the registration list 35, a negative determination is made (S51: NO).

The CPU 12 does not need to determine the registration of the registration list 35 in S51 by the domain name. For example, the CPU 12 may make a negative determination in S51 when the absolute path (http://bbb/list) included in the APP 33C is not registered in the registration list 35.

In S53, the CPU 12 determines, if the APP 33C is tentatively installed and executed, whether or not the setting of the MFP 1 would be changed by accessing a new access destination (e.g., http://bbb/list) that is not included in the registration list 35. The change of the MFP 1 setting here is, for example, the change of the security level of the MFP 1.

Concretely, the changes of the setting include, for example, changes in the registry value used by the firmware such as the program 31 or the operating system, changes in the mode (e.g., the security mode, etc.) owned by the MFP 1, changes of the IP address, changes of the a communication port, changes of the administrator password, changes of the destination of the scanned data, and the like. If the new access destination would be accessed by executing the APP 33C and MFP1 settings would be changed, a security hole or the like may occur, and the security risk may increase. Therefore, when the setting of the MFP 1 is changed by executing the APP 33, the CPU 12 makes an affirmative determination (S53: YES). Note that the method of determining whether or not the setting of the MFP 1 is changed is not particularly limited. For example, when the APP 33C is tentatively executed and the change of setting (e.g., opening of a new communication port) is detected, the CPU 12 may determine that the setting of the MFP 1 is changed.

When the CPU 12 makes an affirmative determination (S53: YES), the CPU 12 executes S47. As a result, the CPU 12 confirms the approval when the setting of the MFP 1 is changed by accessing a new access destination that is not included in the registration list 35. Thus, the user's approval can be confirmed when the security risk increases by executing application 33C to access a new access destination after installation.

In addition, the CPU 12 does not have to execute the determination of the setting change of S53. For example, if the CPU 12 makes a negative determination at S51 (S51: NO), the CPU 12 may omit the determination of S53 and execute S47. As a result, when a new access destination that is not intended for printing is included in the APP 33C and is not in the registration list 35 (not in the APP 33 that has been installed in the past), the approval of installation is confirmed. For example, as shown in APP 33C in FIG. 8C, the user's approval can be confirmed when personal or confidential information is transmitted, such as when login information is transmitted to a new access destination (http:/bbbb/list) that is not in the registration list 35.

On the other hand, when all the domain names included in the APP 33C are registered in the registration list 35 (S51: YES), that is, when no new access destination is included in the APP 33C, the CPU 12 executes S45 and omits the approval. Thus, in the case of the APP 33C including only the access destinations of the APP 33 installed in the past, approval for the installation can be omitted. In other words, even if an update is performed, unless accessing a new access destination, approval of the installation can be omitted.

When a negative determination is made (S53: NO), that is, when the setting of the MFP 1 is not changed even if a new access destination is included in the APP 33C, the CPU 12 executes S45 and omits the approval. Thus, even if a new access destination that is not included in the registration list 35 is included, unless there is change of the setting of the MFP 1, the approval can be omitted and usability can be improved. As above, the CPU 12 according to the present embodiment can omit displaying of the approval screen 51 based on the whitelist 37 or the registration list 35.

As described above, when the whitelist 37 is set (S41: YES), the CPU 12 according to the present embodiment determines, in S43, whether to display the approval screen 51 based on only the whitelist 37 without executing the determination based on the registration list 35 in S51. That is, the determination by the whitelist 37 set by the user is given priority over the determination by the registration list 35 generated from the APP 33. This ensures that, when the user installs the APP 33 that includes access destinations that the user does not allow in whitelist 37, approval is performed. It is noted that the CPU 12 may execute determination using the registration list 35 even when the whitelist 37 is set. Concretely, the CPU 12 may execute the processes of S49 onwards, for example, after a negative determination is made in S43 (S43: NO).

It is noted that the MFP 1 is an example of an information processing device. The CPU 12 is an example of a controller. The non-volatile memory 15 is an example of a storage. The printer 16 is an example of an image forming part. The touch panel 21 is an example of a display. The network interface 24 is an example of a communication interface. The program 31 and the APP 33 are examples of software. The registration list 35 and the whitelist 37 are examples of an access destination list.

5. Effects

As described above, according to the above-described embodiment, the following effects can be achieved.

(1) The MFP 1 according to the present embodiment includes the touch panel 21, the network interface 24, and the CPU 12. The CPU 12 executes the processes (an example of an obtaining process) of S43 and S51 to obtain, from the non-volatile memory 1, the whitelist 37 and the registration list 35 for determining the access destination 5. Upon receiving an installation request requesting installation of the APP 33 via the network interface 24, the CPU 12 executes the processes of S43 and/or S51 (an example of an access destination determining process) to determining whether or not the APP 33 includes a new access destination based on the whitelist 37 and/or the registered list 35. As a result of executing S43 and/or S51, when it is determined that a new access destination is included in the APP 33 (S43: NO, S51: NO), the CPU 12 performs the process of S17 (an example of a displaying process) to display the approval screen 51 for installation of the APP 33 on the touch panel 21. As a result of executing S43 and/or S51, when it is determined that a new access destination is not included in the APP 33 (S43: YES, S51: YES), the CPU 12 omits the process of S17 (an example of an omitting process).

According to this, when installing a new APP 33 or updating an already installed APP 33, the CPU 12 determines whether or not the installed APP 33 includes a new access destination based on the whitelist 37 and the registration list 35. When it is determined that a new access destination is included, the CPU 12 displays the installation approval screen 51. In this way, it is possible to confirm the user's approval for the installation of the APP 33 that accesses the new access destination, thereby increasing security.

On the other hand, when the CPU 12 determines that the new access destination is not included, the CPU 12 omits displaying of the approval screen 51. This reduces user effort by omitting the user's approval when new access destinations are not included and the security risk is low. Therefore, it is possible to achieve both the improvement in usability by omitting displaying of the approval screen 51 and the improvement in security by displaying the approval screen 51.

(2) Further, in the processes of S43 and S51, the CPU 12 determines whether or not a new domain name is included, as a new access destination, in the APP 33 based on the whitelist 37 and the registered list 35, and when it is determined that the new domain name is included in the APP 33 as a result of the processes of S43 and S51, the CPU 12 executes the process of S17, while when it is determined that the new domain name is not included in the APP 33, the process of S17 is omitted.

According to the above configuration, the CPU 12 determines whether or not a new domain name is included in the APP 33 to be installed. If it is determined that the new domain name is included, the CPU 12 confirms the approval for installation. This enables the CPU 12 to confirm the user approval for installation and ensures security when security risks increase when, for example, there is a possibility to access a new domain name and upload a file.

(3) Further, in S43, the CPU 12 obtains the whitelist 37 in which the access destination to which access is permitted is set as the access destination list. In S43, if it is determined that the APP 33 includes a new access destination which is not included in the whitelist 37 (S43: NO), the CPU 12 executes S17, while if it is determined that all the access destinations included in the APP 33 are included in the whitelist 37 (S43: YES), S17 is omitted.

According to this configuration, the CPU 12 compares the access destination in the APP 33 to be installed with the access destination in the whitelist 37. When it is determined that the whitelist 37 includes all the access destinations included in the APP 33, the CPU 12 omits approval for installation. Thus, by registering the access destination to which access is permitted in the whitelist 37 in advance, it is possible to omit the approval for installation of the APP 33 including the access destination included in the whitelist 37.

(4) In S11 (an example of an obtaining process), when installing the APP 33, the CPU 12 extracts the access destination included in APP 33, and obtains the registration list 35, in which the extracted access points are registered, as an access destination list in S51. When the CPU 12 receives an installation request that requests an update of the APP 33 in S51, the CPU 12 compares the registration list 35 generated during the previous installation with the access destination included in the APP 33 used for this update, and determines whether or not the APP 33 used for the update (APP 33B and APP 33C) includes a new access destination.

According to the above configuration, the CPU 12 generates the registration list 35 by extracting the access destination of the APP 33 at the time of installation. Each time the APP 33 is updated, the CPU 12 can update the registration list 35 and accumulate the history of the access destinations. The CPU 12 can efficiently check whether or not there is a new access destination by checking whether or not the access destination, which is not included in the registration list 35, is included in the update APP 33.

(5) Further, when a new access destination is included in the APP 33, and data is sent to the new access destination if the APP 33 is executed after installed (S51: NO), the CPU 12 executes S17. According to this configuration, when the APP 33 to be installed includes the new access destination, and when the APP 33 is executed after installation, data is sent to the new access destination, the user's approval is confirmed. In this way, when security risks such as information leakage may increase, user approval can be confirmed and security can be improved.

(6) The MFP 1 further includes a printer 16 configured to print an image based on the print data (an example of image forming data). When the APP 33 is executed after installing, if the CPU 12 receives the print data from the access destination included in the APP 33 and executes printing of the image by the printer 16 according to the received print data (S49: YES), the CPU 12 omits S17.

In an image forming apparatus such as a printing apparatus, software that receives image forming data and performs printing has a lower security risk, such as information leakage, in comparison with software that transmits data to external devices. Therefore, when the software is the APP 33 which receives the print data and prints the image, the installation approval is omitted. As a result, where or not to execute the approval for installation can be determined in accordance with the process content of the image forming apparatus and the security risk caused by the process.

(7) As a result of the process of SM, when the new access destination is included in the APP 33 and the setting of the MFP 1 will be changed as the APP 33 accesses the new access destination if the APP 33 is executed after installed (S53: YES), the CPU 12 executes the process of S17. When the new access point is accessed by executing the installed APP 33 and the setting of the MFP 1 is changed as a result, there is a possibility that a security risk such as an unintended action of the user is executed or a security hole is generated is increased. Therefore, when the security level of the MFP 1 is changed, such as changing the OS, the firmware, registry values, or the network settings, the security can be enhanced by confirming the user's approval.

6. Modifications

It should be noted that aspects of the present disclosures should not be limited to the above-described configurations, and various modifications can be made without departing from aspects of the present disclosures.

For example, the software according to the present disclosures does not need to be limited to the APP 33, but may be an add-on program or an operating system. Further, the CPU 12 does not need to generate the registration list 35. Instead, the CPU 12 may be configured to obtain access destination information from a providing source of the software and register the obtained information in the registration list 35.

Although the CPU 12 determines the access destination by the domain name, the CPU 12 may be configured to alternatively or optionally determine the access destination by the absolute path, the folder path, the relative path, and the like. For example, absolute paths (such as http://bbb/list) may be registered in the whitelist 37.

The MFP 1 may be configured such that the register the whitelist 37 cannot be registered in the MFP 1. In such a case, the CPU 12 may start the process from S49 in the list comparing process shown in FIG. 7.

Further, the MFP 1 does not need to include the registered listing 35. For example, the CPU 12 may be configured to determine the access destination referring to only the whitelist 37. Further, the CPU 12 may accept, from a use or the like, a blacklist indicating destinations to which access is not permitted, and judge an access destination based on the blacklist.

Figure 11:
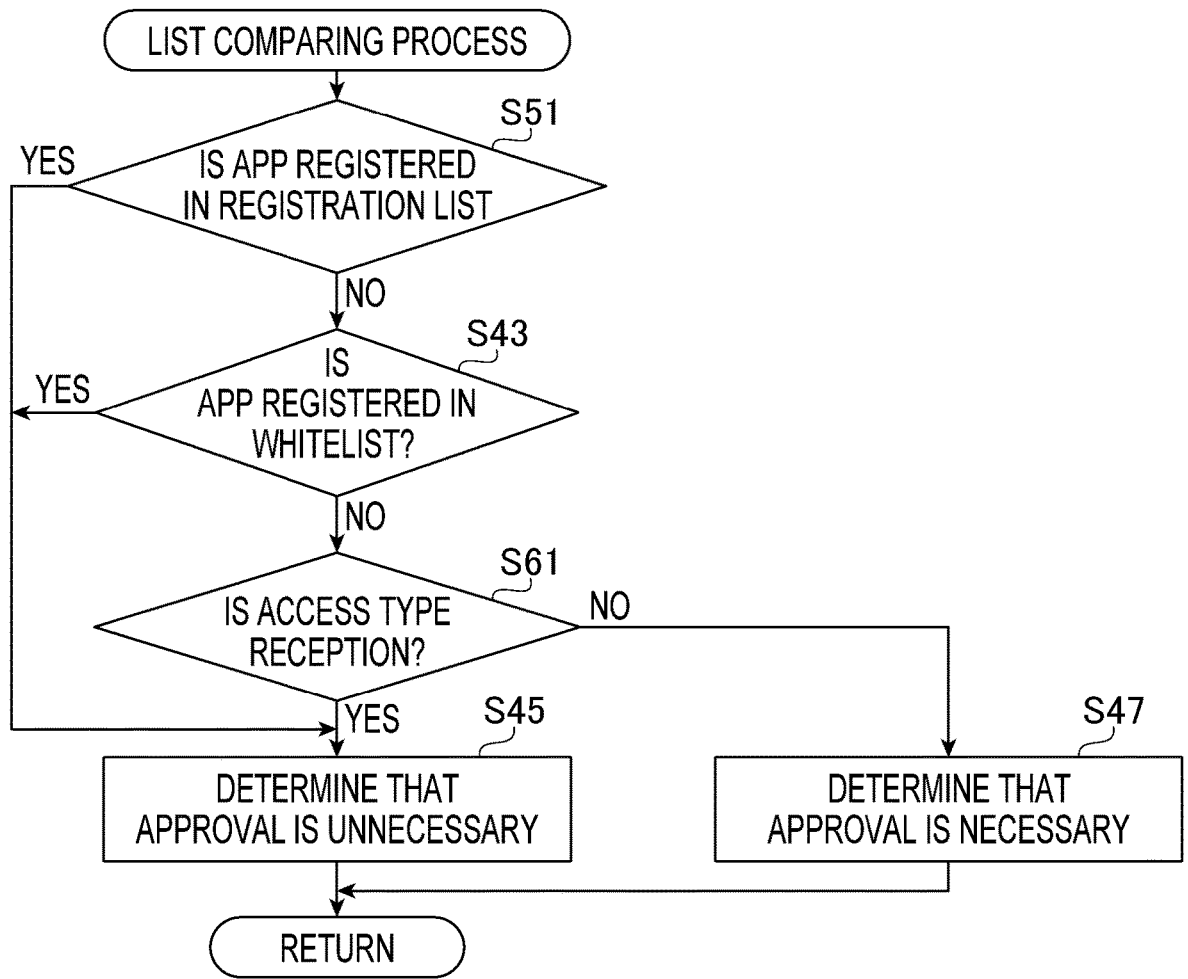
FIG. 11 is a flowchart illustrating another list comparing process.

The contents and order of the list comparing process shown in FIG. 7 are only an example. FIG. 11 illustrates another example of the list comparison process. In the following description, the same processes as in FIG. 7 are indicated with the same signs and the descriptions thereof are omitted as appropriate. As shown in FIG. 11, when the CPU 12 starts the list comparison process, the CPU 12 first determines whether the access destination included in the APP 33 to be installed has been registered in the registration list 35 (S51). When it is determined that the access point has been registered (S51: YES), the approval is not necessary (S45). In other words, if the App 33 to be installed does not have a new access point that is not in the registration list 35, approval is not required. Also, if the access point not in the registration list 35 is included in App 33 (S51: NO), CPU 12 confirms the whitelist 37, and if the access point not in the whitelist 37 is included in the App 33 (S43: NO), the CPU 12 determines the type of access destination (S61). In addition, if the whitelist 37 itself is not set, the CPU 12 may make a negative judgment at S43 (S43: NO).

The CPU 12 determines whether or not the access type of the new access destination that is not registered in both the registration list 35 and the whitelist 37 is aimed to reception (S61). The CPU 12 can determine the access type of the new access destination by using the access type determination table 39 shown in FIG. 4. When the access type is the reception (S61: YES), the CPU 12 omits the approval (S45), while when the access type is the transmission (S61: NO), the CPU 12 displays the approval screen 51 (S47). As described above, the CPU 12 may first determine whether or not there is a new access destination based on the registration list 35 and the whitelist 37, and, when a new access destination exists, the CPU 12 may determine whether access type of the new access destination is the transmission or reception. When the new access destination that is not in the registration list 35 or the whitelist 37 is the access destination for the reception purposes, the CPU 12 omits the approval, while the CPU 12 confirms the approval when the access destination is for transmission purposes. That is, when data is transmitted externally, the approval may be confirmed.

The CPU 12 may be configured to confirm the approval if the MFP 1 settings may be changed regardless whether the access destination is the new access point. For example, when an affirmative determination is made in S51 of FIG. 7 (S51: YES), the CPU 12 may be configured to determine whether or not the setting of the MFP 1 could be changed by installing the APP 33, and may confirm the approval when the setting could be changed. That is, the CPU 12 may be configured to confirm the approval when the MFP 1 setting (such as authentication information) could be changed by installing the APP 33 without accessing the new access destination. Further, the CPU 12 may be configured to confirm the approval even if the access destination is aimed to print the downloaded data.

In addition to or instead of the whitelist 37 and the registration list 35, the CPU 12 may determine whether to display the approval screen 51 using a blacklist in which access destinations not permitted to access are registered. For example, if the access destination registered in the blacklist is included in the APP 33 to be installed, the CPU 12 may confirm the approval, while the CPU 12 may omit the approval if the access destination registered in the blacklist is not included in the APP 33 to be installed. Alternatively, if the access destination registered in the blacklist is included in the APP 33 to be installed, the CPU 12 may abort the installation without confirming the approval, while the CPU 12 may confirm the approval if the access destination registered in the blacklist is not included in the APP 33 to be installed.

In the embodiment described above, the non-volatile memory 15 provided in the MFP 1 is employed as the storage device for storing the registered list 35 according to the present disclosures, but the present disclosures does not need to be limited to this configuration. For example, an external server device may be employed as the storage device, and the MFP 1 may be configured to download the registration list 35 from the server device through the network interface 24.

Further, in the above-described embodiment, the CPU 12 that executes a predetermined program is adopted as the controller according to the present disclosures, but the controller does not need to be limited to this configuration. For example, the controller may be composed of dedicated hardware such as ASIC (Applied Scientific Integrated Circuit). Alternatively, the controller may be configured to operate both software processing and hardware processing in combination, for example.

Further, in the above-described embodiment, the MFP1 is adopted as the information processing device according to the present disclosures. However, the present disclosures do not need to be limited to such a configuration. The information processing apparatus according to the present disclosures can employ a printer having only a printing function, or various apparatuses capable of installing software such as a sewing machine.

According to the information processing device, the software installation method, and the non-transitory computer-readable recording medium storing the programs according to the present disclosures, when installing a new software or updating the installed software, it is determined whether the software to be installed includes a new access point or not, based on the access destination list. The access destination here refers to information that indicates the location where data inside and outside the device is stored, such as URLs and folder paths to access external servers such as web servers and file servers, and address values and folder paths to access a specific area of the storage unit of the information processing unit. If the information processing device determines that a new access destination is included, it displays the installation approval screen. This allows to confirm the user's approval for the installation of software that accesses a new access point, thereby increasing security.

On the other hand, when it is determined that the information processing device does not include a new access destination, displaying of the approval screen is omitted. This reduces user effort by omitting approval when new access destinations are not included and the security risk is low. Therefore, it is possible to achieve both improvement in usability by omitting displaying of the approval screen and improvement in security by displaying the approval screen. The software installation in this application is not only the case of newly installing the software on the information processing apparatus but also the case of installing the software for updating the installed software.

What is claimed is:

1. An information processing device comprising:
    a display;
    a communication interface; and
    a controller comprising hardware, the controller being electrically connected to the communication interface, the controller being configured to perform:
    downloading and analyzing software to extract access destinations included in the downloaded software in response to receiving, via the communication interface, an installation or update request;
    obtaining access destination information from a storage;
    determining whether a new access destination is included in the downloaded software by comparing the extracted access destinations with the obtained access destination information;
    when it is determined that a new access destination is included in the downloaded software and a condition is not satisfied, displaying an approval screen prompting a user to approve installation of the downloaded software prior to installation; and
    when it is determined that a new access destination is not included in the downloaded software, installing the downloaded software without displaying the approval screen.

2. The information processing device according to claim 1, wherein the condition is a same domain name, wherein, in the determining,
    the controller is configured to: determine whether a new domain name is included in the downloaded software by comparing domain names in the extracted access destinations with domain names in the obtained access destination information; and
        when it is determined that a new domain name is included in the downloaded software, the condition is not satisfied and the approval screen is displayed; and
        when it is determined that a new domain name is not included in the downloaded software, the condition is satisfied and the displaying of the approval screen is omitted.

3. The information processing device according to claim 1,
    wherein the controller is configured to:
        obtain, in the obtaining the access destination information, a whitelist comprising access destinations to which access is permitted; and
        when it is determined that any new access destination that is not included in the whitelist is included in the downloaded software, the condition is not satisfied and the approval screen is displayed; and
        when it is determined that all new access destinations included in the downloaded software are included in the whitelist, the condition is satisfied, and the displaying of the approval screen is omitted.

4. The information processing device according to claim 1,
    wherein the controller is configured to:
    obtain, in the obtaining the access destination information, registration information in which access destinations included in software are registered when the software is installed; and
    when receiving the update request to update the software, determine, in the determining whether a new access destination is included in the downloaded software, whether the new access destination is included in the downloaded software used for updating by comparing the registration information generated at a time of installation of the software and an access destination included in the downloaded software.

5. The information processing device according to claim 1, wherein the condition is related to data transmission, and
    wherein the controller is configured to display the approval screen when the new access destination is included in the downloaded software and data transmission to the new access destination would be executed if the downloaded software would be executed after installation.

6. The information processing device according to claim 1,
    further comprising an image forming part configured to form an image based on image forming data, wherein the condition is related to image formation, and
    wherein the controller is configured to omit the displaying of the approval screen if the downloaded software would be executed after installation, the controller would receive the image forming data from an access destination included in the downloaded software and execute forming of an image by the image forming part based on the received image forming data.

7. The information processing device according to claim 1, wherein the condition is related to changing settings, and
wherein the controller is configured to display the approval screen when the new access destination is included in the downloaded software and if the downloaded software would be executed after installation, the downloaded software would access the new access destination and change setting of the information processing device.

8. The information processing device according to claim 1, wherein the approval screen comprises information related to the new access destination in the downloaded software.

9. A method of installing software in an information processing device having a display and a communication interface,
the method including:
downloading and analyzing software to extract access destinations included in the downloaded software in response to receiving, via the communication interface, an installation or update request;
obtaining access destination information from a storage;
determining whether a new access destination is included in the downloaded software by comparing the extracted access destinations with the obtained access destination information;
when it is determined that a new access destination is included in the downloaded software and a condition is not satisfied, displaying an approval screen to prompt a user to approve installation of the downloaded software prior to installation; and
when it is determined that a new access destination is not included in the downloaded software, installing the downloaded software without displaying the approval screen.

10. The method according to claim 9, wherein the condition is a same domain name, wherein the determining includes
determining whether determining whether a new domain name is included in the downloaded software by comparing domain names in the extracted access destinations with domain names in the obtained access destination information; and
when it is determined that a new domain name is included in the downloaded software, the condition is not satisfied and the approval screen is displayed; and
when it is determined that a new domain name is not included in the downloaded software, the condition is satisfied and the displaying of the approval screen is omitted.

11. The method according to claim 9,
the obtaining includes obtaining a whitelist comprising access destinations to which access is permitted; and
when it is determined that any new access destination that is not included in the whitelist is included in the downloaded software, the condition is not satisfied and the approval screen is displayed; and
when it is determined that all new access destinations included in the downloaded software are included in the whitelist, the condition is satisfied and the displaying of the approval screen is omitted.

12. The method according to claim 9,
further including:
obtaining, in the obtaining the access destination information, registration information in which access destinations included in software are registered when the software is installed; and
when receiving the update request to update the software, determining, in the determining whether a new access destination is included in the downloaded software, whether the new access destination is included in the downloaded software used for updating by comparing the registration information generated at a time of installation of the software and an access destination included in the downloaded software.

13. The method according to claim 9, wherein the condition is related to data transmission, and
the approval screen is displayed when the new access destination is included in the downloaded software and data transmission to the new access destination would be executed if the software would be executed after installation.

14. The method according to claim 9, wherein the condition is related to image formation,
wherein, when the downloaded software is executed after installation, the displaying of the approval screen is omitted if image forming data from an access destination included in the downloaded software is received and an image is formed by an image forming part of the information processing device based on the received image forming data.

15. The method according to claim 9, wherein the condition is related to changing settings and
the approval screen is displayed when the new access destination is included in the downloaded software and if the downloaded software would be executed after installation, the downloaded software would access the new access destination and change setting of the information processing device.

16. The method according to claim 9, wherein the approval screen comprises information related to the new access destination in the downloaded software.

17. A non-transitory computer-readable recording medium for an information processing device provided with a display, a communication interface and a controller, the recording medium storing instructions which cause, when executed by the controller, the information processing device to perform:
downloading and analyzing software to extract access destinations included in the downloaded software in response to receiving, via the communication interface, an installation or update request;
obtaining access destination information from a storage;
determining whether a new access destination is included in the downloaded software by comparing the extracted access destinations with the obtained access destination information;
when it is determined that a new access destination is included in the downloaded software and a condition is not satisfied, displaying an approval screen to prompt a user to approve installation of the downloaded software prior to installation; and
when it is determined that a new access destination is not included in the downloaded software, installing the downloaded software without displaying the approval screen.

18. The non-transitory computer-readable recording medium according to claim 17, wherein the condition is a same domain name, wherein the instructions further cause, when executed by the controller, the information processing device to perform in the determining:
determining whether a new domain name is included in the downloaded software;
when it is determined that a new domain name is included in the downloaded software, the condition is not satisfied, and the approval screen is displayed; and
when it is determined that a new domain name is not included in the downloaded software, the condition is satisfied and the displaying of the approval screen is omitted.

19. The non-transitory computer-readable recording medium according to claim 17,
wherein the instructions further cause, when executed by the controller, the information processing device to perform in the obtaining:
obtaining a whitelist comprising access destinations to which access is permitted; and
when it is determined that any new access destination that is not included in the whitelist is included in the downloaded software, the condition is not satisfied and the approval screen is displayed; and
when it is determined that all new access destinations included in the downloaded software are included in the whitelist, the condition is satisfied and the displaying of the approval screen is omitted.

20. The non-transitory computer-readable recording medium according to claim 17,
wherein the instructions further cause, when executed by the controller, the information processing device to perform:
obtaining, in the obtaining the access destination information, registration information in which access destinations included in software are registered when the software is installed as the access destination information; and
when receiving the update request to update the software, determining, in the determining whether a new access destination is included in the software, whether the new access destination is included in downloaded software used for updating by comparing the registration information generated at a time of installation of the software and an access destination included in the downloaded software.

21. The non-transitory computer-readable recording medium according to claim 17,
wherein the condition is related to data transmission and
wherein the instructions further cause, when executed by the controller, the information processing device to display the approval screen when the new access destination is included in the downloaded software and data transmission to the new access destination would be executed if the downloaded software would be executed after installation.

22. The non-transitory computer-readable recording medium according to claim 17, wherein the approval screen comprises information related to the new access destination in the downloaded software.

* * * * *